(12) United States Patent
Li et al.

(10) Patent No.: US 10,832,877 B2
(45) Date of Patent: Nov. 10, 2020

(54) KEYCAP FORMING METHOD (71) Applicant: Primax Electronics Ltd., Taipei (TW)

(72) Inventors: Che-An Li, Taipei (TW); Sheng-Fan Chang, Taipei (TW)

(73) Assignee: PRIMAX ELECTRONICS LTD, Taipei (TW)

( * ) Notice: Subject to any disclaimer, the term of this patent is extended or adjusted under 35 U.S.C. 154(b) by 191 days.

(21) Appl. No.: 16/044,746

(22) Filed: Jul. 25, 2018

(65) Prior Publication Data
US 2019/0371545 A1    Dec. 5, 2019

(30) Foreign Application Priority Data
Jun. 1, 2018   (TW) ................................. 107118991

(51) Int. Cl.
*H01H 13/88*   (2006.01)
*H01H 13/86*   (2006.01)
*B29C 45/00*   (2006.01)

(52) U.S. Cl.
CPC ............ *H01H 13/88* (2013.01); *H01H 13/86* (2013.01); *B29C 2045/0063* (2013.01); *H01H 2229/044* (2013.01)

(58) Field of Classification Search
CPC ............................................... H01H 2229/044
See application file for complete search history.

(56) References Cited

U.S. PATENT DOCUMENTS

| | | | | |
|---|---|---|---|---|
| 8,614,401 B2 * | 12/2013 | Tseng | ................... | H01H 13/807 200/5 A |
| 8,927,884 B2 * | 1/2015 | Shih | ................... | G06F 3/0202 200/5 A |
| 9,443,673 B2 * | 9/2016 | Chu | ................... | H01H 13/704 |
| 2015/0122622 A1 * | 5/2015 | Deng | ................... | H01H 13/705 200/5 A |
| 2019/0091906 A1 * | 3/2019 | Bopp | ................ | B29C 45/14073 |

FOREIGN PATENT DOCUMENTS

| | | | | |
|---|---|---|---|---|
| EP | 0162458 A2 * | 11/1985 | ............ | B29C 49/062 |
| JP | WO2011040150 A1 * | 2/2013 | ......... | B29C 45/2606 |

OTHER PUBLICATIONS

JP-WO2011040150 (Shimotsuma) Feb. 2013 (Google Patents online machine translation), [Retrieved on Mar. 23, 2020]. Retrieved from: Google Patents (Year: 2013).*

* cited by examiner

*Primary Examiner* — Alison L Hindenlang
*Assistant Examiner* — Andrés E. Behrens, Jr.
(74) *Attorney, Agent, or Firm* — Kirton McConkie; Evan R. Witt (57) ABSTRACT

A keycap forming method includes the following steps. Firstly, a stabilizer bar is formed through a first male mold and a first female mold according to an injection molding process, and a keycap is formed through a second male mold and a second female mold according to the injection molding process. Then, the stabilizer bar is fixed on the first male mold, and the keycap is fixed on the second female mold. Then, the first male mold and the second female mold are stacked on each other, so that the stabilizer bar and the keycap are combined together. Then, the first male mold and the second female mold are separated from each other, so that the stabilizer bar is detached from the first male mold. By using the keycap forming method, it is not necessary to manually assemble the stabilizer bar with the keycap.

8 Claims, 13 Drawing Sheets

KEYCAP FORMING METHOD

FIELD OF THE INVENTION

The present invention relates to a keyboard device, and more particularly to a keycap forming method for a keyboard device.

BACKGROUND OF THE INVENTION

Generally, the widely-used peripheral input device of a computer system includes for example a mouse device, a keyboard device, a trackball device, or the like. Via the keyboard device, characters or symbols can be inputted into the computer system directly. As a consequence, most users and most manufacturers of input devices pay much attention to the development of keyboard devices. The subject of the present invention is related to a keyboard device.

Figure 1:
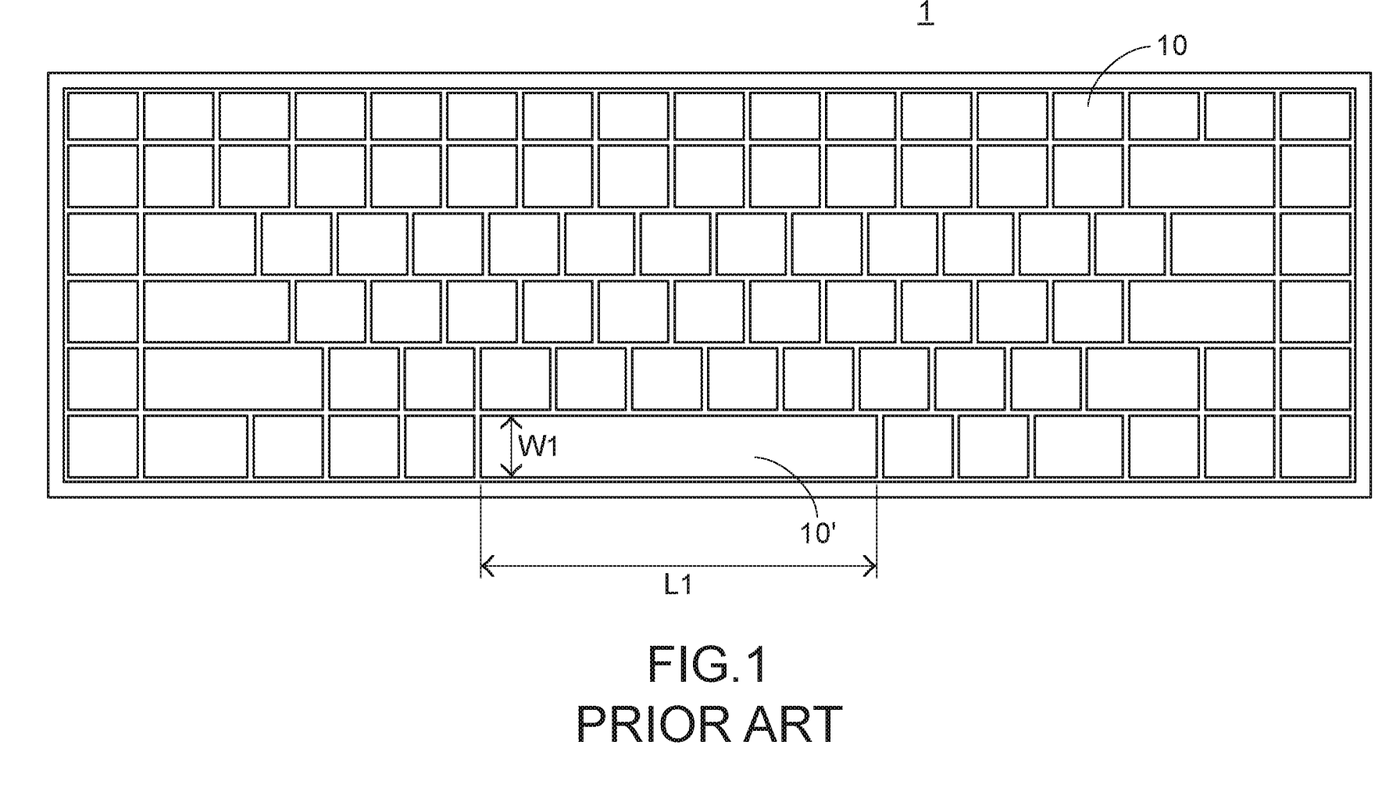
FIG. 1 is a schematic top view illustrating the outer appearance of a conventional keyboard device.

FIG. 1 is a schematic top view illustrating the outer appearance of a conventional keyboard device. As shown in FIG. 1, plural key structures 10 and 10' are disposed on a top surface of the conventional keyboard device 1. The key structures 10 have the ordinary sizes. The key structures 10' are relatively longer. That is, the length of the key structure 10 is slightly larger than the width of the key structure 10, and the length L1 of the key structure 10' is much larger than the width W1 of the key structure 10'. When one of the key structures 10 and 10' is depressed by the user's finger, a corresponding key signal is generated to the computer, and thus the computer executes a function corresponding to the depressed key structure. Generally, the user may depress the key structures 10 and 10' to input corresponding English letters (or symbols) or numbers or execute various functions (e.g., F1~F12 or Delete). For example, the conventional keyboard device 1 is a keyboard for a notebook computer.

Figure 2:
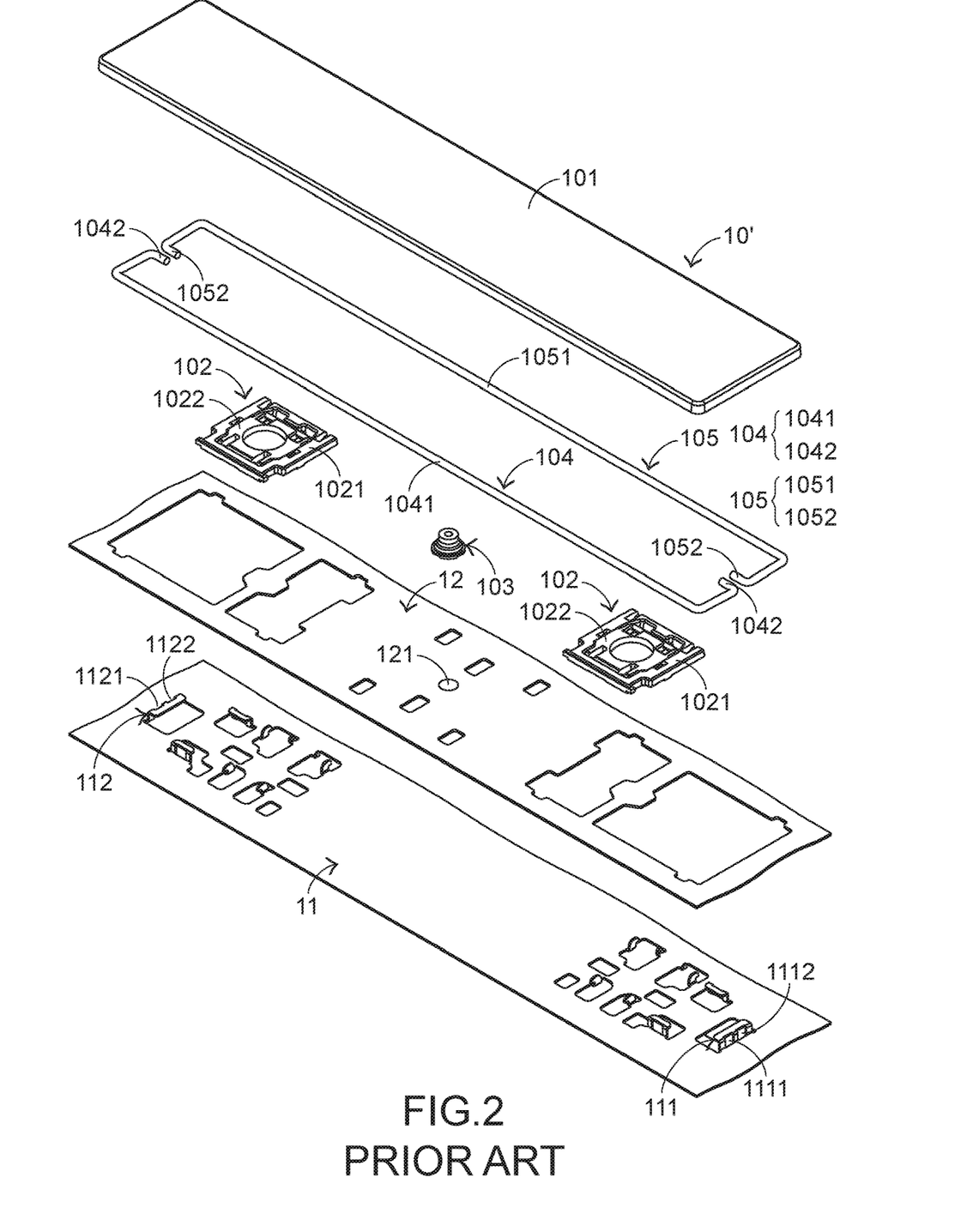
FIG. 2 is a schematic exploded view illustrating a portion of the conventional keyboard device and taken along a viewpoint.
Figure 3:
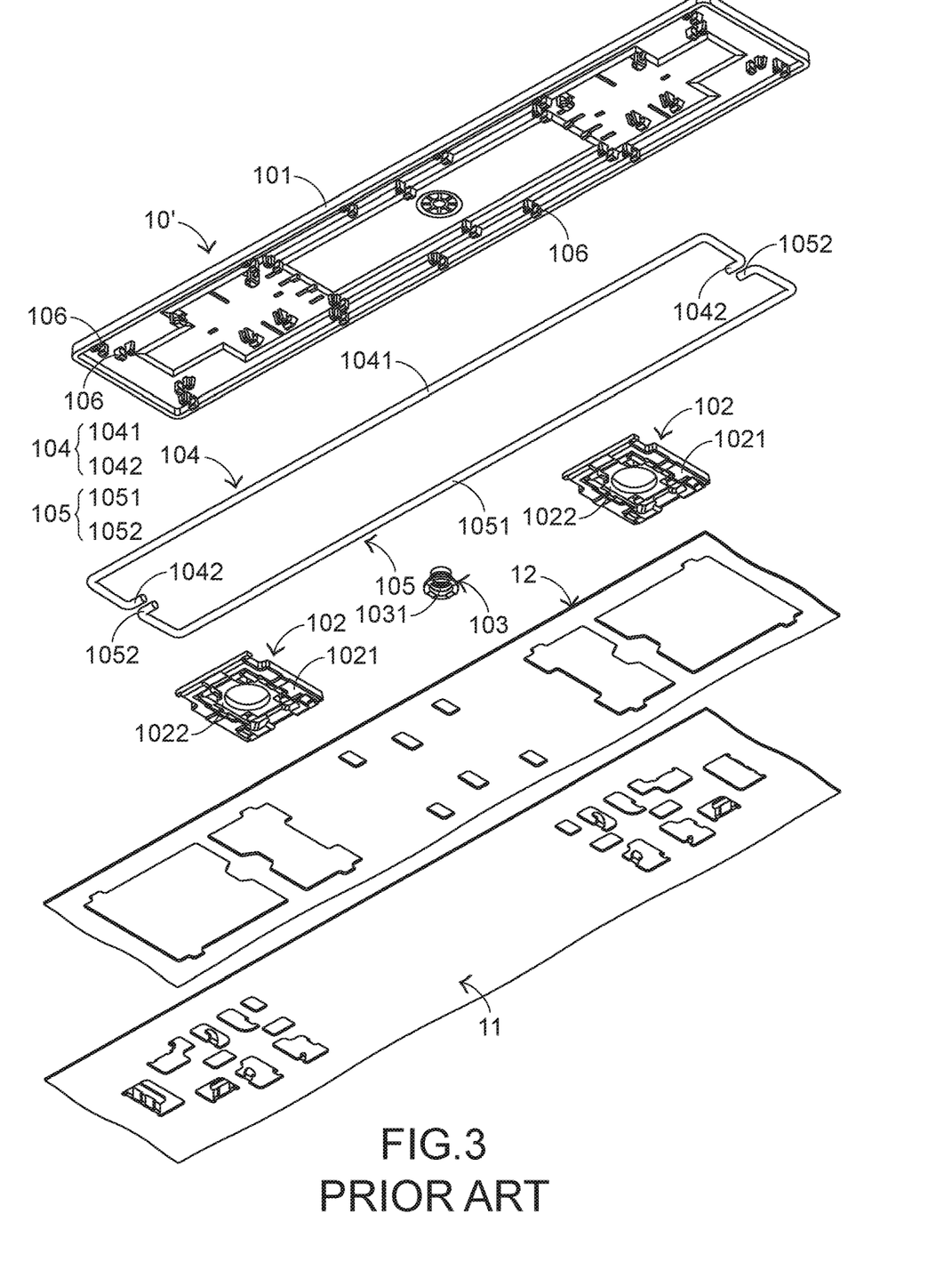
FIG. 3 is a schematic exploded view illustrating a portion of the conventional keyboard device and taken along another viewpoint.

The inner structures of the conventional keyboard device will be illustrated as follows. FIG. 2 is a schematic exploded view illustrating a portion of the conventional keyboard device and taken along a viewpoint. FIG. 3 is a schematic exploded view illustrating a portion of the conventional keyboard device and taken along another viewpoint. Please refer to FIGS. 1, 2 and 3. The conventional keyboard device 1 comprises plural key structures 10 and 10', a metallic base plate 11 and a membrane circuit board 12. The membrane circuit board 12 comprises plural membrane switches 121 corresponding to the plural key structures 10 and 10'. Each of the plural key structures 10 and 10' comprises a keycap 101, at least one scissors-type connecting element 102 and a rubbery elastomer 103. The scissors-type connecting element 102 is connected between the keycap 101 and the metallic base plate 11. Moreover, the scissors-type connecting element 102 comprises a first frame 1021 and a second frame 1022. The second frame 1022 is pivotally coupled to the first frame 1021. Consequently, the first frame 1021 and the second frame 1022 can be swung relative to each other. The rubbery elastomer 103 is arranged between the keycap 101 and the metallic base plate 11. Moreover, the rubbery elastomer 103 comprises a contacting part 1031.

While the keycap 101 of any key structure 10 or 10' is depressed and moved downwardly relative to the metallic base plate 11, the first frame 1021 and the second frame 1022 of the scissors-type connecting element 102 are switched from an open-scissors state to a stacked state. Moreover, as the keycap 101 is moved downwardly to compress the rubbery elastomer 103, the corresponding membrane switch 121 is pushed and triggered by the contacting part 1031 of the rubbery elastomer 103. Consequently, the membrane circuit board 12 generates a corresponding key signal. When the keycap 101 of the key structure 10 or 10' is no longer depressed, the keycap 101 is moved upwardly relative to the metallic base plate 11 in response to an elastic force of the rubbery elastomer 103. Meanwhile, the first frame 1021 and the second frame 1022 are switched from the stacked state to the open-scissors state again, and the keycap 101 is returned to its original position.

In the keyboard device 1, the key structures 10' and the key structures 10 are distinguished. As shown in the drawings, the length L1 of the key structure 10' is much larger than the width W1 of the key structure 10'. Since the length L1 of the keycap 101 of the key structure 10' is relatively longer, the keycap 101 is readily rocked while the key structure 10' is depressed. That is, the operating smoothness of the key structure 10' is adversely affected, and even the tactile feel of the user is impaired. For increasing the operating smoothness of the key structure 10', the key structure 10' is further equipped with a special mechanism. For example, the key structure 10' further comprises a first stabilizer bar 104, a second stabilizer bar 105 and plural hooks 106. The first stabilizer bar 104 comprises a first linking bar part 1041 and two first hook parts 1042. The two first hook parts 1042 are located at two ends of the first stabilizer bar 104, respectively. The second stabilizer bar 105 comprises a second linking bar part 1051 and two second hook parts 1052. The two second hook parts 1052 are located at two ends of the second stabilizer bar 105, respectively.

The metallic base plate 11 comprises a first connecting structure 111 and a second connecting structure 112. The first connecting structure 111 and the second connecting structure 112 are protruded upwardly, and penetrated through the membrane circuit board 12. The first connecting structure 111 comprises a first locking hole 1111 and a third locking hole 1112. The second connecting structure 112 comprises a second locking hole 1121 and a fourth locking hole 1122. The second locking hole 1121 corresponds to the first locking hole 1111. The fourth locking hole 1122 corresponds to the third locking hole 1112.

The first linking bar part 1041 of the first stabilizer bar 104 and the second linking bar part 1051 of the second stabilizer bar 105 are pivotally coupled to the corresponding hooks 106 of the keycap 101 of the key structure 10'. The two first hook parts 1042 of the first stabilizer bar 104 are penetrated through the first locking hole 1111 of the first connecting structure 111 and the second locking hole 1121 of the second connecting structure 112, respectively. The two second hook parts 1052 of the second stabilizer bar 105 are penetrated through the third locking hole 1112 of the first connecting structure 111 and the fourth locking hole 1122 of the second connecting structure 112, respectively.

Figure 4:
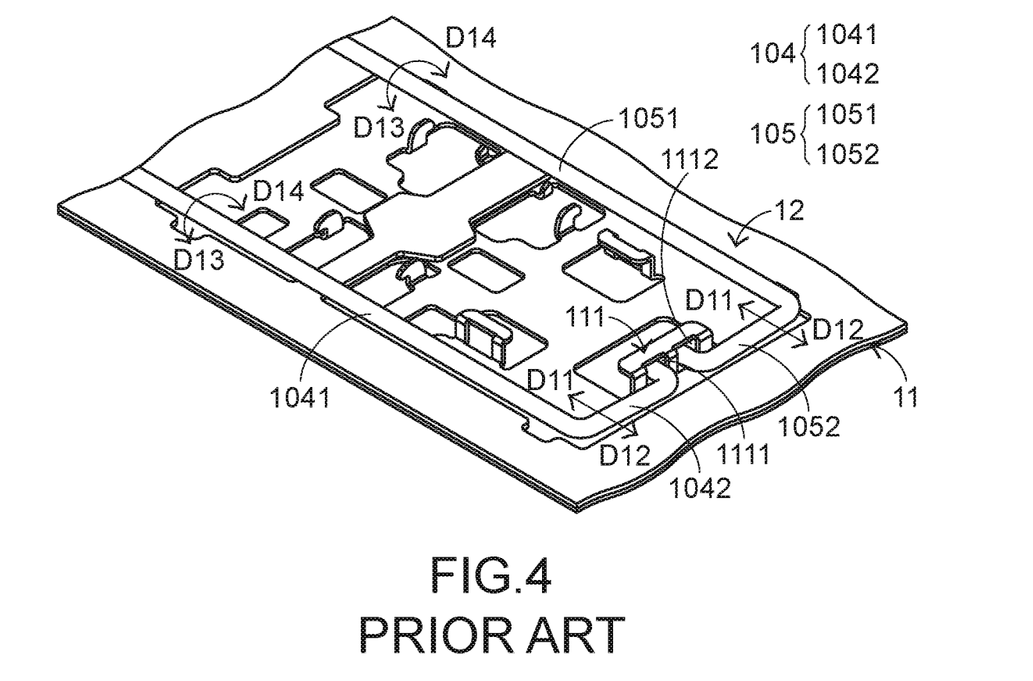
FIG. 4 schematically illustrates the actions of the first stabilizer bar and the second stabilizer bar of the conventional keyboard device.

FIG. 4 schematically illustrates the actions of the first stabilizer bar and the second stabilizer bar of the conventional keyboard device. While the keycap 101 of the key structure 10' is moved upwardly or downwardly relative to the metallic base plate 11, the first stabilizer bar 104 is moved in a first direction D11 or a second direction D12 and rotated in a first rotating direction D13 or a second rotating direction D14. Similarly, the second stabilizer bar 105 is moved in the first direction D11 or the second direction D12 and rotated in the first rotating direction D13 or the second rotating direction D14. By the first stabilizer bar 104 and the second stabilizer bar 105, the key structure 10' is kept stable and not inclined while the key structure 10' is moved upwardly or downwardly relative to the metallic base plate 11. Moreover, the uses of the first stabilizer bar 104 and the second stabilizer bar 105 are helpful to increase the strength of the keycap 101.

The arrangements of the first stabilizer bar 104 and the second stabilizer bar 105 have the above advantages. However, since it is necessary to assemble the first stabilizer bar 104 and the second stabilizer bar 105 with the keycap 101, the fabricating cost of the keyboard device 1 is increased. Generally, the process of assembling the first stabilizer bar 104 and the second stabilizer bar 105 with the keycap 101 is manually performed. The manual assembling process is time-consuming and labor-intensive. Moreover, since the assembling process is readily erroneous, the hooks 106 of the keycap 101 are possibly broken.

SUMMARY OF THE INVENTION

An object of the present invention provides a keycap forming method for reducing the fabricating cost of a keyboard device.

In accordance with an aspect of the present invention, there is provided a keycap forming method. The keycap forming method includes the following steps. In a step A, a stabilizer bar is formed through a first male mold and a first female mold according to an injection molding process. In a step B, a keycap is formed through a second male mold and a second female mold according to the injection molding process. In a step C, the first male mold and the first female mold are separated from each other, and the second male mold and the second female mold are separated from each other. In a step D, the first male mold and the second female mold are aligned with and stacked on each other, so that the stabilizer bar and the keycap are combined together. In a step E, the first male mold and the second female mold are separated from each other, so that the stabilizer bar is detached from the first male mold.

In an embodiment, the step (A) includes steps (A1) and (A2). In the step (A1), the first male mold and the first female mold are stacked on each other. In the step (A2), a first molding material is injected into a space between the first male mold and the first female mold according to the injection molding process. The first molding material is filled into a first molding groove of the first male mold and a second molding groove of the first female mold. Consequently, the stabilizer bar is formed.

In an embodiment, the step (E) includes steps (E1) and (E2). In the step (E1), the first male mold and the second female mold are separated from each other. In the (E2), plural fixing structures of the first male mold to be shrunk back into the first male mold to externally push the stabilizer bar. Consequently, the stabilizer bar is detached from the plural fixing structures and fixed on the keycap.

Preferably, in the step (E), a first segment of the stabilizer bar is fixed in the hook of the keycap, and a second segment of the stabilizer bar is fixed on plural fixing structures of the first male mold.

From the above descriptions, the present invention provides the keycap forming method. Firstly, the stabilizer bar is formed through the first male mold and the first female mold, and the keycap is formed through the second male mold and the second female mold. Then, the stabilizer bar is moved through the first male mold, the second male mold, the first female mold and the second female mold. Moreover, the stabilizer bar and the keycap are combined together during the process of forming the keycap. After the stabilizer bar is separated from the first male mold, the keycap with the combined stabilizer bar is produced. In accordance with the method of the present invention, it is not necessary to manually assemble the stabilizer bar with the keycap. The keycap forming method of the present invention is completely automatic. The assembling precision of the keycap forming method of the present invention is higher than that of the manual assembling method. Consequently, the possibility of causing damage of the keycap during the assembling process will be largely reduced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For overcoming the drawbacks of the conventional technologies, the present invention provides a keycap forming method. The device for performing the keycap forming method will be illustrated as follows.

Figure 5:
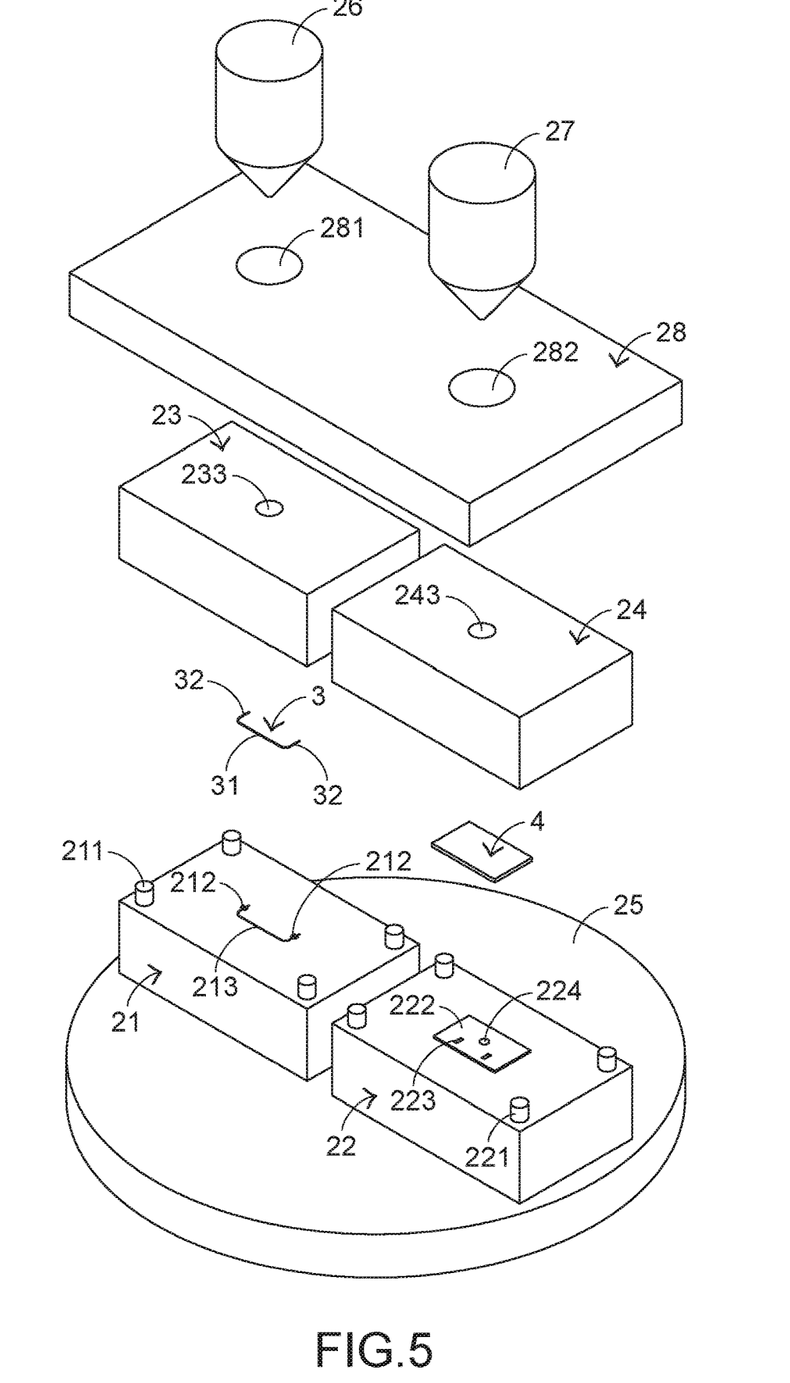
FIG. 5 schematically illustrates a first male mold, a second male mold, a first female mold and a second female mold of a device for performing a keycap forming method according to an embodiment of the present invention and taken along a viewpoint.
Figure 6:
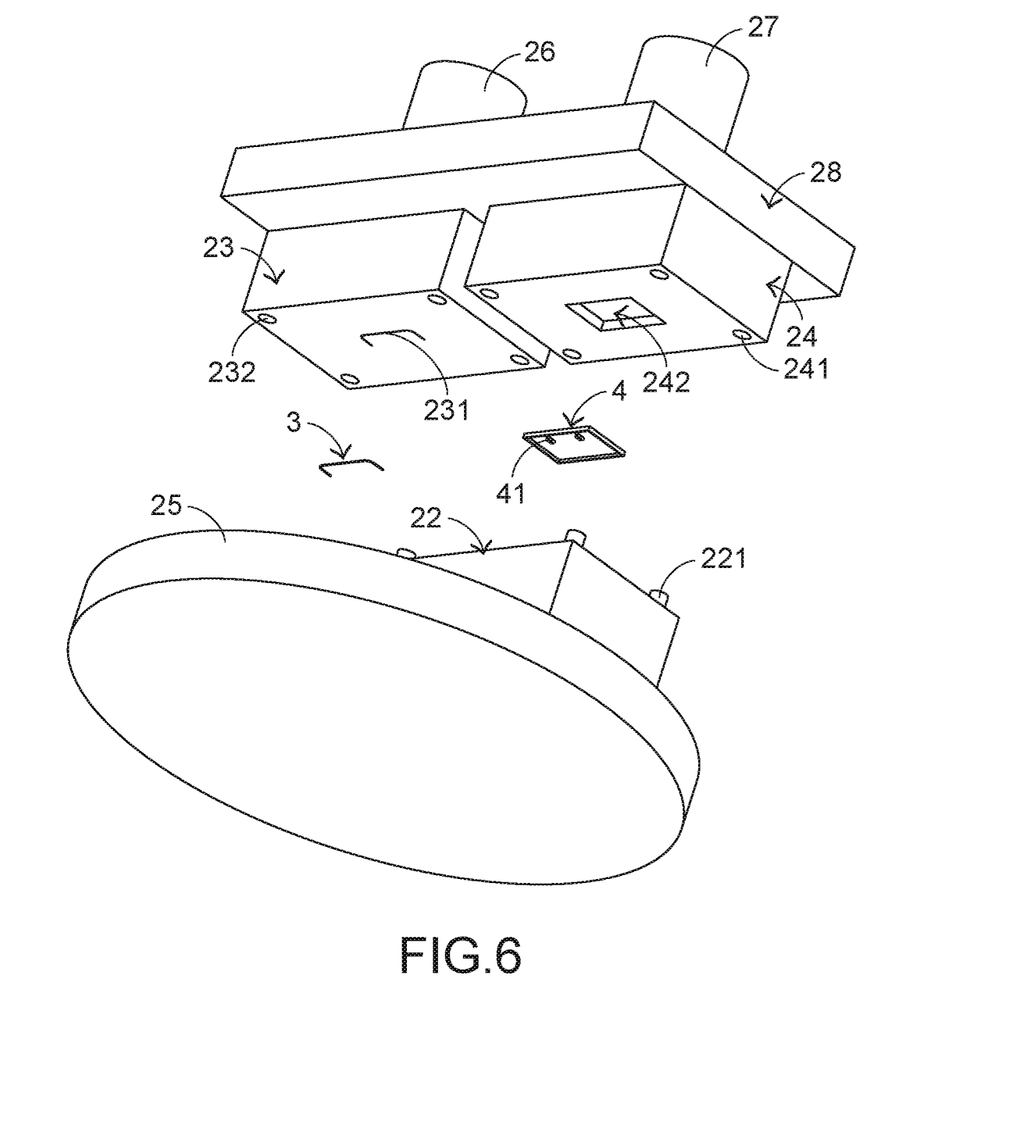
FIG. 6 schematically illustrates the first male mold, the second male mold, the first female mold and the second female mold of the device for performing the keycap forming method according to the embodiment of the present invention and taken along another viewpoint.

Please refer to FIGS. 5 and 6. FIG. 5 schematically illustrates a first male mold, a second male mold, a first female mold and a second female mold of a device for performing a keycap forming method according to an embodiment of the present invention and taken along a viewpoint. FIG. 6 schematically illustrates the first male mold, the second male mold, the first female mold and the second female mold of the device for performing the keycap forming method according to the embodiment of the present invention and taken along another viewpoint. In FIGS. 5 and 6, a first male mold 21, a second male mold 22, a first female mold 23, a second female mold 24, a moving mechanism 25, a first storage tank 26, a second storage tank 27, a fixing plate 28, a stabilizer bar 3 and a keycap 4 are shown. The stabilizer bar 3 comprises a first segment 31 and a second segment 32. The keycap 4 comprises plural hooks 41. The first male mold 21 comprises plural first fixing posts 211, plural fixing structures 212 corresponding to the stabilizer bar 3, and a first molding groove 213 corresponding to the stabilizer bar 3. The second male mold 22 comprises plural second fixing posts 221, a raised structure 222 corresponding to the keycap 4, plural hook recesses 223 corresponding to the plural hooks 41, and an ejecting mechanism 224. The first molding groove 213 is a core of the first male mold 21. The raised structure 222 and the plural hook recesses 223 are collaboratively defined as a core of the second male mold 22. The moving mechanism 25 is connected with the first male mold 21 and the second male mold 22. Moreover, the first male mold 21 and the second male mold 22 are movable or rotatable by the moving mechanism 25.

The first female mold 23 is fixed on the fixing plate 28. The first female mold 23 comprises a second molding groove 231 corresponding to the stabilizer bar 3, plural first fixing holes 232, and a first feeding channel 233. The second female mold 24 is fixed on the fixing plate 28 and located beside the first female mold 23. The second female mold 24 comprises plural second fixing holes 241, a concave structure 242 corresponding to the keycap 4, and a second feeding channel 243. The second molding groove 231 is a cavity of the first female mold 23. The concave structure 242 is a cavity of the second female mold 24. The fixing plate 28 is used for fixing the first female mold 23 and the second female mold 24. The fixing plate 28 comprises a first opening 281 and a second opening 282. After the first female mold 23 and the second female mold 24 are fixed on the fixing plate 28, the first opening 281 is aligned with the first feeding channel 233 and the second opening 282 is aligned with the second feeding channel 243. A first molding material is contained in the first storage tank 26. Moreover, a portion of the first storage tank 26 is inserted into the first opening 281. A second molding material is contained in the second storage tank 27. A portion of the second storage tank 27 is inserted into the second opening 282.

In this embodiment, the first female mold 23 and the second female mold 24 are fixed on the fixing plate 28 and not movable. The first male mold 21 and the second male mold 22 are connected with the moving mechanism 25. Consequently, the first male mold 21 and the second male mold 22 are moved or rotated with the moving mechanism 25. It is noted that numerous modifications and alterations may be made while retaining the teachings of the invention. For example, in another embodiment, the first female mold and the second female mold are connected with the moving mechanism, and the first male mold and the second male mold are fixed on the fixing plate. Consequently, the first female mold and the second female mold are moved or rotated with the moving mechanism, but the first male mold and the second male mold are not movable.

The connecting relationship between the keycap 4 and the scissors-type connecting element is not the subject of the present invention. Consequently, the hooks of the keycap 4 to be connected with the scissors-type connecting element are not shown in FIG. 6. For succinctness, only the hooks 41 of the keycap 4 corresponding to the stabilizer bar 3 are shown in FIG. 6.

Figure 7:
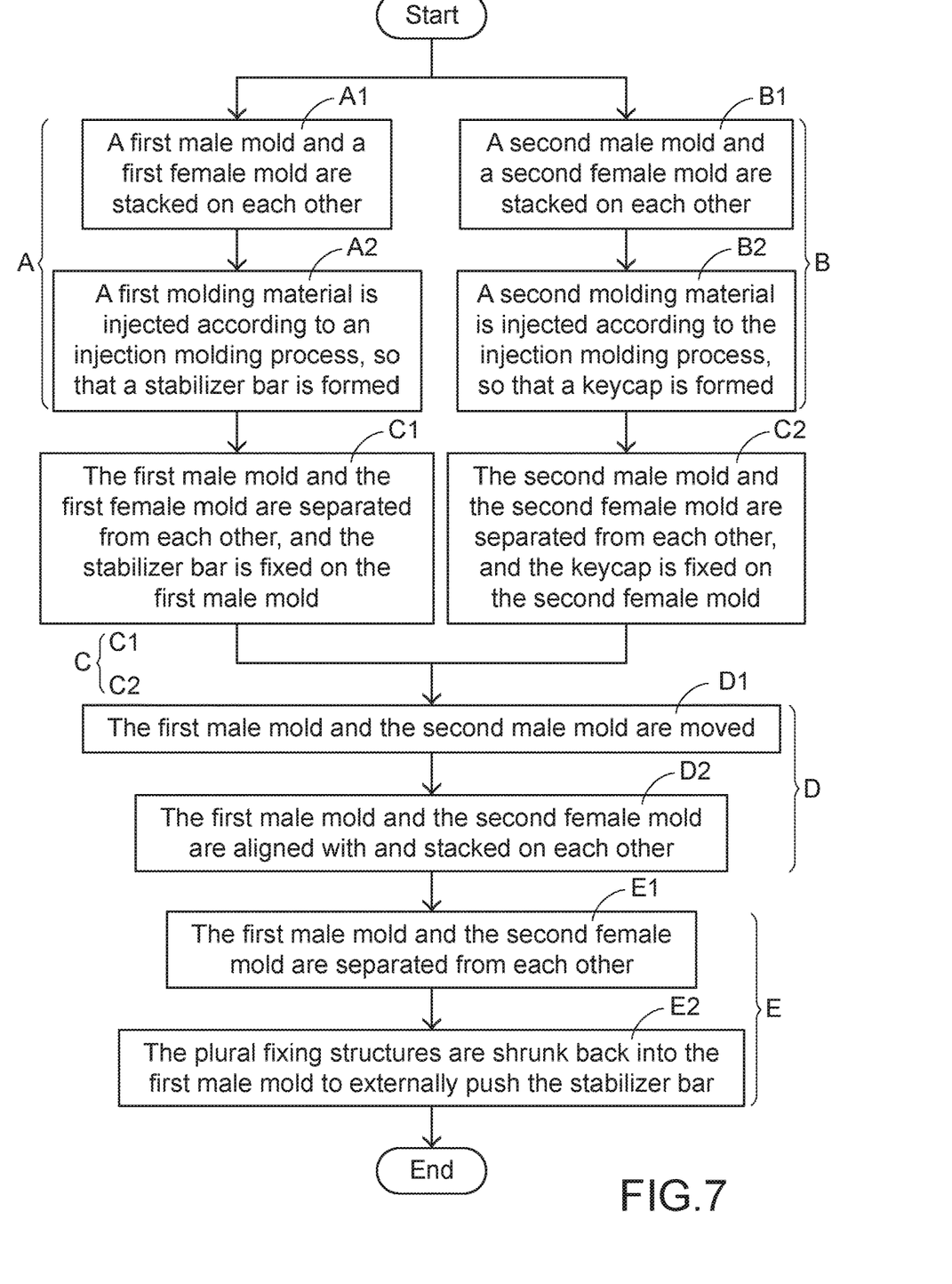
FIG. 7 is a flowchart illustrating a keycap forming method according to an embodiment of the present invention.

A keycap forming method of the present invention will be described as follows. FIG. 7 is a flowchart illustrating a keycap forming method according to an embodiment of the present invention. The keycap forming method comprises the following steps.

In a step A, a stabilizer bar is formed through a first male mold and a first female mold according to an injection molding process. In a step B, a keycap is formed through a second male mold and a second female mold according to the injection molding process. In a step C, the first male mold and the first female mold are separated from each other, and the second male mold and the second female mold are separated from each other. In a step D, the first male mold and the second female mold are aligned with and stacked on each other, so that the stabilizer bar and the keycap are combined together. In a step E, the first male mold and the second female mold are separated from each other, so that the stabilizer bar is detached from the first male mold.

The step A comprises steps A1 and A2. In the step A1, the first male mold and the first female mold are stacked on each other. In the step A2, a first molding material is injected according to the injection molding process, so that the stabilizer bar is formed.

The step B comprises steps B1 and B2. In the step B1, the second male mold and the second female mold are stacked on each other. In the step B2, a second molding material is injected according to the injection molding process, so that the keycap is formed.

The step C comprises steps C1 and C2. In the step C1, the first male mold and the first female mold are separated from each other, and the stabilizer bar is fixed on the first male mold. In the step C2, the second male mold and the second female mold are separated from each other, and the keycap is fixed on the second female mold.

The step D comprises steps D1 and D2. In the step D1, the first male mold and the second male mold are moved. In the step D2, the first male mold and the second female mold are aligned with and stacked on each other.

The step E comprises steps E1 and E2. In the step E1, the first male mold and the second female mold are separated from each other. In the step E2, the plural fixing structures are shrunk back into the first male mold to externally push the stabilizer bar.

Figure 8:
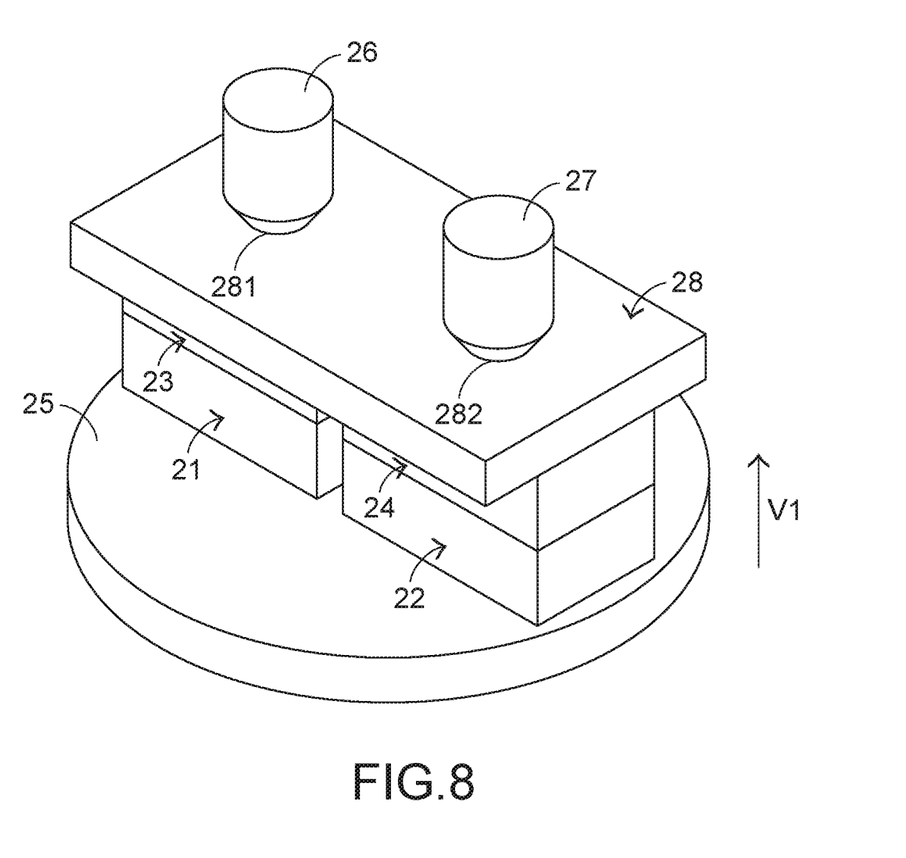
FIG. 8 schematically illustrates a step of performing the injection molding process according to the keycap forming method of the present invention.
Figure 9:
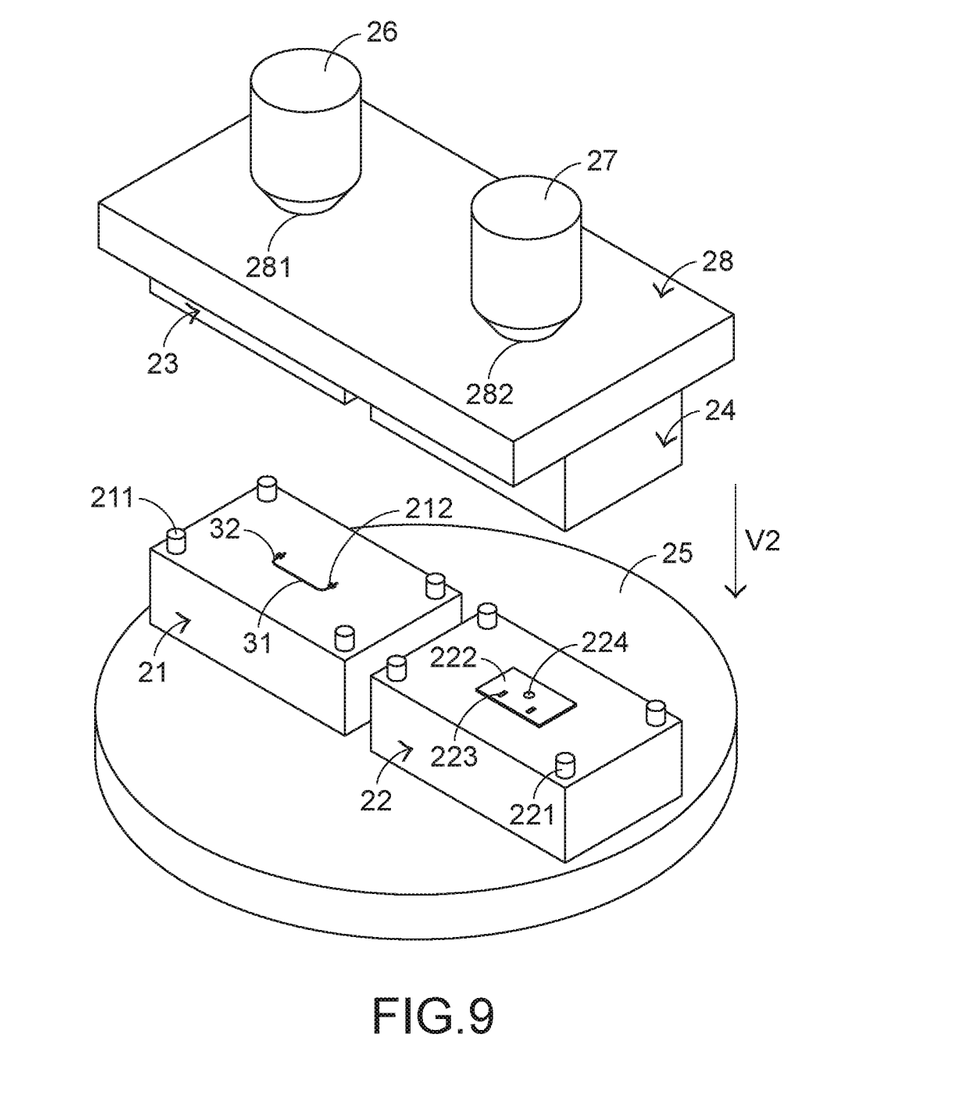
FIG. 9 schematically illustrates a step of fixing the stabilizer bar on the first male mold according to the keycap forming method of the present invention.

Hereinafter, the operations of the keycap forming method and the associated molds will be described with reference to FIGS. 8 and 9. FIG. 8 schematically illustrates a step of performing the injection molding process according to the keycap forming method of the present invention. FIG. 9 schematically illustrates a step of fixing the stabilizer bar on the first male mold according to the keycap forming method of the present invention. Firstly, in the step A1, the moving mechanism 25 is moved in a first direction V1. As the first male mold 21 is moved with the moving mechanism 25, the first male mold 21 and the first female mold 23 are stacked on each other (see FIG. 8). When the first male mold 21 and the first female mold 23 are stacked on each other, the plural first fixing posts 211 are inserted into the corresponding first fixing holes 232. Consequently, the first male mold 21 and the first female mold 23 are not shifted toward the left and right sides. Moreover, while the first male mold 21 and the first female mold 23 are stacked on each other, the plural fixing structures 212 of the first male mold 21 are pushed by the first female mold 23. Consequently, the plural fixing structures 212 are shrunk back into the first male mold 21.

In the step A2, the first molding material is injected into the space between the first male mold 21 and the first female mold 23 through the first male mold 21 and the first female mold 23 according to the injection molding process. Consequently, the stabilizer bar 3 is formed. During the injection molding process, the first molding material is injected from the first storage tank 26 to the first molding groove 213 of the first male mold 21 and the second molding groove 231 of the first female mold 23 through the first feeding channel 233. Consequently, the stabilizer bar 3 is formed in the first molding groove 213 and the second molding groove 231. In an embodiment, the first molding material is made of a plastic material with higher rigidity.

While the step A is performed, the step B1 is performed to move the moving mechanism 25 in the first direction V1. As the second male mold 22 is moved with the moving mechanism 25, the second male mold 22 and the second female mold 24 are stacked on each other (see FIG. 8). When the second male mold 22 and the second female mold 24 are stacked on each other, the plural second fixing posts 221 are inserted into the corresponding second fixing holes 241. Consequently, the second male mold 22 and the second female mold 24 are not shifted toward the left and right sides. In the step B2, the second molding material is injected into the space between the second male mold 22 and the second female mold 24 (i.e., the space between the raised structure 222 and the concave structure 242). Consequently, the keycap 4 is formed. During the process of forming the keycap 4, the injected second molding material is filled into the plural hook recesses 223 of the second male mold 22. Consequently, the plural hooks 41 of the keycap 4 are formed. In an embodiment, the second molding material is made of a plastic material.

Figure 10:
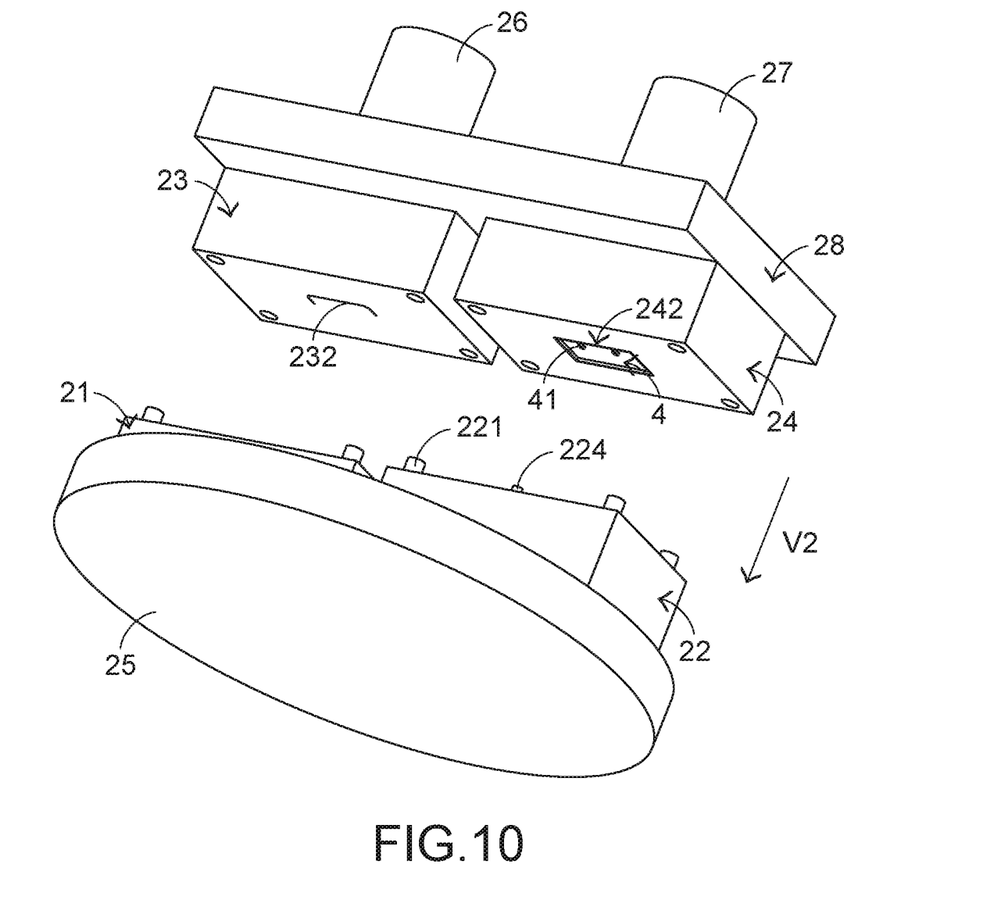
FIG. 10 schematically illustrates a step of fixing the keycap on the second female mold according to the keycap forming method of the present invention.

Please refer to FIGS. 9 and 10. FIG. 10 schematically illustrates a step of fixing the keycap on the second female mold according to the keycap forming method of the present invention. After the step A and the step B are completed, the step C is performed. In the step C1, the moving mechanism 25 is moved in a second direction V2, which is opposite to the first direction V1. As the first male mold 21 is moved with the moving mechanism 25, the first male mold 21 and the first female mold 23 are separated from each other. Meanwhile, the plural fixing structures 212 are protruded out of the first male mold 21. That is, the plural fixing structures 212 are protruded out in the first direction V1, so that the stabilizer bar 3 is fixed on the plural fixing structures 212. In such way, the stabilizer bar 3 is not detached from the first male mold 21. In this embodiment, the second segment 32 of the stabilizer bar 3 is fixed on the plural fixing structures 212.

In the step C2, the moving mechanism 25 is moved in the second direction V2 to move the second male mold 22. Consequently, the second male mold 22 and the second female mold 24 are separated from each other, and the keycap 4 is fixed in the concave structure 242 of the second female mold 24. While the moving mechanism 25 is moved in the second direction V2 to move the second male mold 22, the ejecting mechanism 224 of the second male mold 22 is moved in the first direction V1. That is, the ejecting mechanism 224 is protruded out of the second male mold 22 to push the keycap 4 in the first direction V1. Consequently, the keycap 4 is detached from the second male mold 22. At the same time, the keycap 4 is fixed in the concave structure 242 of the second female mold 24. In an embodiment, the second ejecting mechanism 224 of the second male mold 22 is an angle lifter. The operations of the angle lifter are well known to those skilled in the art, and are not redundantly described herein.

Figure 11:
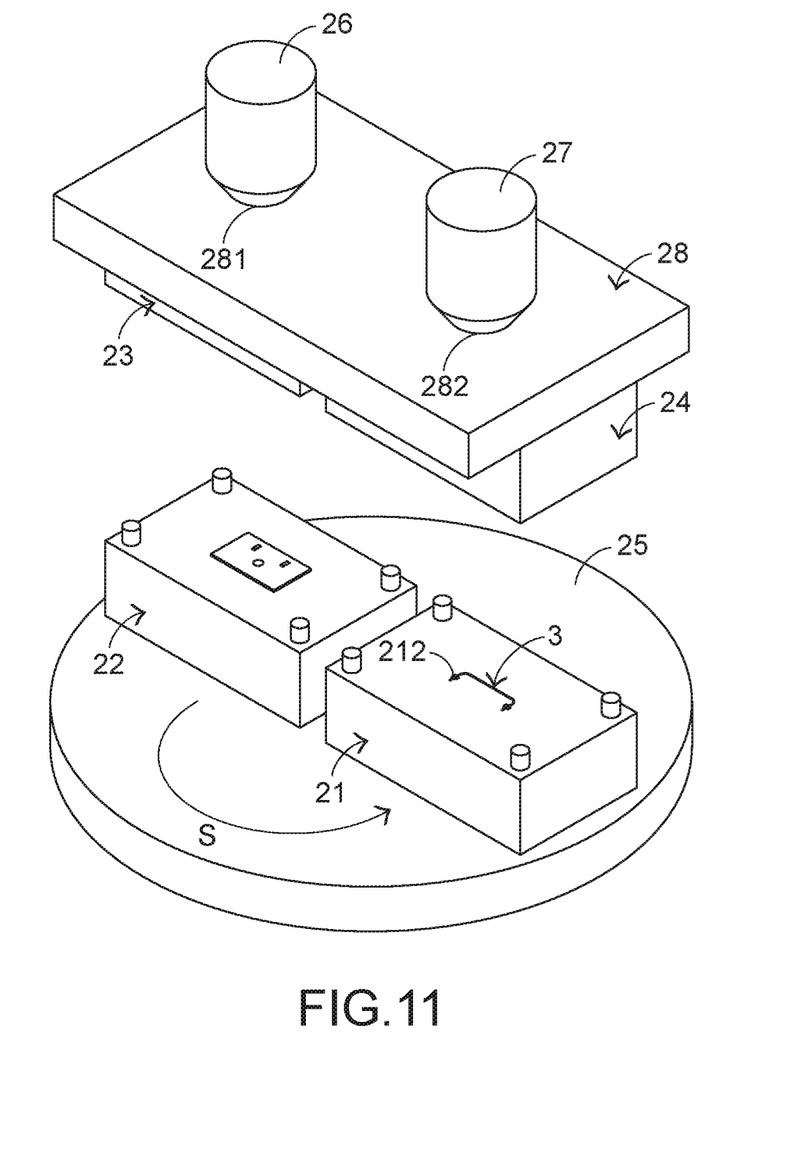
FIG. 11 schematically illustrates a step of aligning the first male mold with the second female mold according to the keycap forming method of the present invention.
Figure 12:
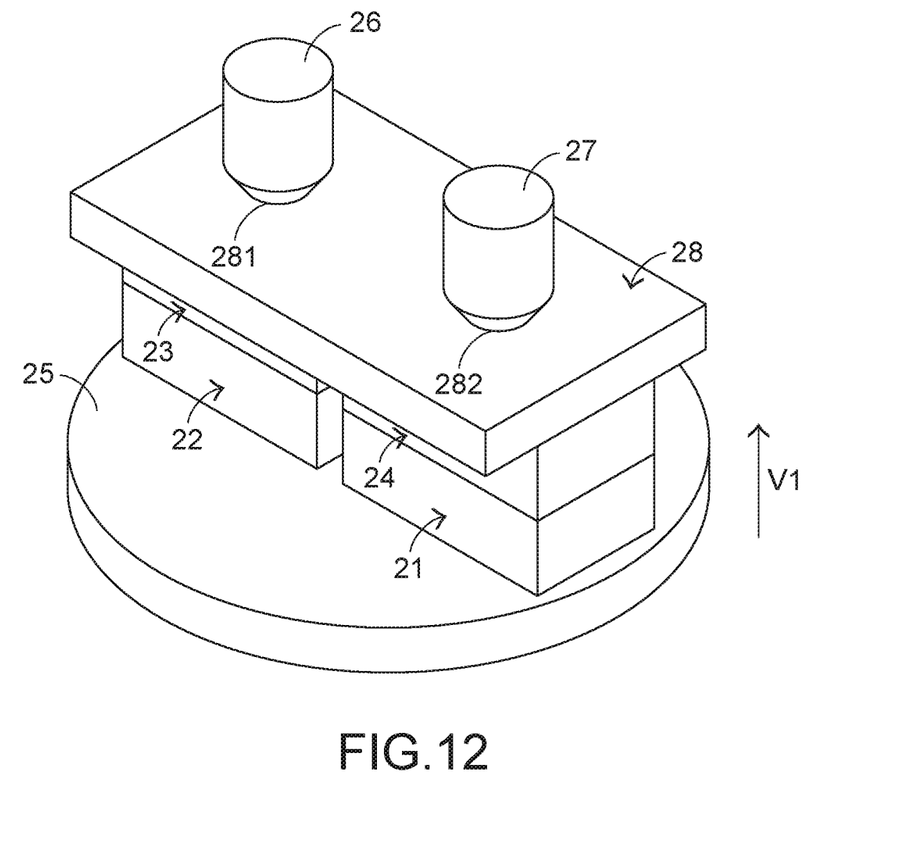
FIG. 12 schematically illustrates a step of stacking the first male mold and the second female mold on each other according to the keycap forming method of the present invention.

Please refer to FIGS. 7, 11 and 12. FIG. 11 schematically illustrates a step of aligning the first male mold with the second female mold according to the keycap forming method of the present invention. FIG. 12 schematically illustrates a step of stacking the first male mold and the second female mold on each other according to the keycap forming method of the present invention.

After the step C is performed. The step D1 is performed. As the moving mechanism 25 is rotated in a rotating direction S, the first male mold 21 and the second male mold 22 are moved. Consequently, the first male mold 21 is away from the first female mold 23, and the first male mold 21 is close to the second female mold 24. Meanwhile, the first male mold 21 and the second female mold 24 are aligned with each other. The method of aligning the first male mold 21 with the second female mold 24 is well known to those skilled in the art, and is not redundantly described herein. The fixing structures 212 of the first male mold 21 and the second female mold 24 are precisely designed. Consequently, when the first male mold 21 is moved to the position under the second female mold 24 and aligned with the second female mold 24, the plural hooks 41 of the keycap 4 are located over the first segment 31 of the stabilizer bar 3.

After the first male mold 21 and the second female mold 24 are aligned with each other, the step D2 is performed. The rotation of the moving mechanism 25 is stopped, and the moving mechanism 25 is moved in the first direction V1 to move the first male mold 21. Consequently, the first male mold 21 and the second female mold 24 are stacked on each other (see FIG. 12). When the first male mold 21 and the second female mold 24 are stacked on each other, the plural first fixing posts 211 are inserted into the corresponding second fixing holes 241. Consequently, the first male mold 21 and the second female mold 24 are not shifted toward the left and right sides. Moreover, when the first male mold 21 and the second female mold 24 are stacked on each other, the stabilizer bar 3 and the keycap 4 are combined together. However, the stabilizer bar 3 is still connected with the first male mold 21. In other words, the first segment 31 of the stabilizer bar 3 is fixed in the plural hooks 41 of the keycap 4, and the second segment 32 of the stabilizer bar 3 is fixed on the plural fixing structures 212 of the first male mold 21.

Figure 13:
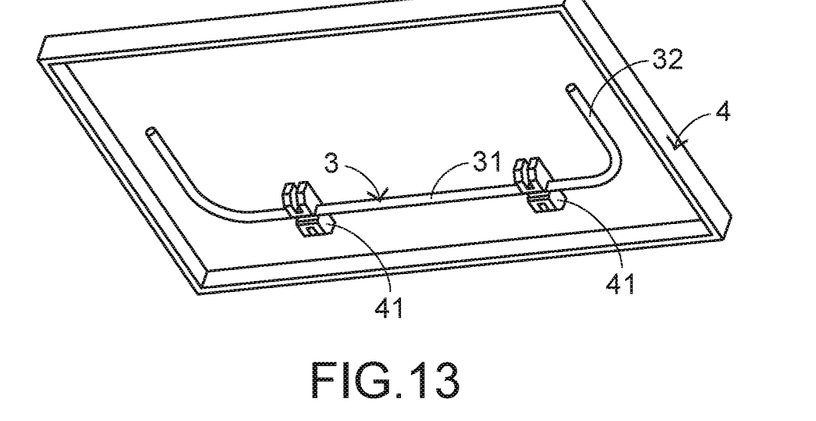
FIG. 13 is a schematic perspective view illustrating a keycap produced by the keycap forming process according to the embodiment of the present invention.

After the stabilizer bar 3 and the keycap 4 are combined together, the step E1 is performed. In the step E1, the moving mechanism 25 is moved in the second direction V2. As the first male mold 21 is moved with the moving mechanism 24, the first male mold 21 and the second female mold 24 are separated from each other. In the step E2, the plural fixing structures 212 are shrunk back into the first male mold 21, so that the stabilizer bar 3 is externally pushed by the first male mold 21. Meanwhile, the stabilizer bar 3 is detached from the plural fixing structures 212, and the stabilizer bar 3 is only fixed on the plural hooks 41 of the keycap 4. Consequently, the stabilizer bar 3 and the keycap 4 are combined together (see FIG. 13). The keycap forming method of the present invention is completed.

The following three aspects should be specially described.

Firstly, in the step E of the above embodiment, the plural fixing structures 212 are shrunk back into the first male mold 21. Consequently, the stabilizer bar 3 is externally pushed by the first male mold 21, and the stabilizer bar 3 is detached from the first male mold 21. It is noted that numerous modifications and alterations may be made while retaining the teachings of the invention. For example, in another embodiment, the first male mold is equipped with an ejecting mechanism corresponding to the stabilizer bar. Consequently, while the first male mold and the second female mold are separated from each other, a stronger force is provided to externally push the stabilizer bar to facilitate separating the stabilizer bar from the first male mold.

Secondly, the first feeding channel corresponding to the first storage tank is not restrictedly formed in the first female mold, and the second feeding channel corresponding to the second storage tank is not restrictedly formed in the second female mold. That is, the method of the present invention may be varied according to the practical requirements. For example, the first feeding channel is formed in the first male mold, the first storage tank is connected with the first male mold, the second feeding channel is formed in the second male mold, and the second storage tank is connected with the second male mold.

Thirdly, in the above embodiment, the first male mold and the second male mold are not simultaneously moved. That is, the method of the present invention may be varied according to the practical requirements. For example, the first male mold is connected with a first moving mechanism, and the second male mold is connected with a second moving mechanism. Consequently, the movement of the first male mold and the movement of the second male mold are independent from each other. Under this circumstance, the step A and the step B are individually performed but are not simultaneously performed. Moreover, the sequence of the step A and the step B is not restricted. However, the step A and the step B are performed before the step C.

From the above descriptions, the present invention provides the keycap forming method. Firstly, the stabilizer bar is formed through the first male mold and the first female mold, and the keycap is formed through the second male mold and the second female mold. Then, the stabilizer bar is moved through the first male mold, the second male mold, the first female mold and the second female mold. Moreover, the stabilizer bar and the keycap are combined together during the process of forming the keycap. After the stabilizer bar is separated from the first male mold, the keycap with the combined stabilizer bar is produced. In accordance with the method of the present invention, it is not necessary to manually assemble the stabilizer bar with the keycap. The keycap forming method of the present invention is completely automatic. The assembling precision of the keycap forming method of the present invention is higher than that of the manual assembling method. Consequently, the possibility of causing damage of the keycap during the assembling process will be largely reduced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A keycap forming method, comprising steps of:
   (A) forming a stabilizer bar through a first male mold and a first female mold according to an injection molding process, wherein the first male mold comprises plural fixing structures corresponding and laterally adjacent to the stabilizer bar and configured to shrink back into the first male mold when forming the stabilizer bar;
   (B) forming a keycap through a second male mold and a second female mold according to the injection molding process;
   (C) separating the first male mold from the first female mold, and separating the second male mold from the second female mold, wherein the plural fixing structures are configured to protrude out of the first male mold to fix the stabilizer bar on the first male mold when separating the first male mold from the first female mold; wherein the second male mold comprises an ejecting mechanism configured to protrude out of the second male mold to push and detach the keycap from the ejecting mechanism and the second male mold when separating the second male mold from the second female mold, so that the keycap is fixed on the second female mold;
   (D) allowing the first male mold and the second female mold to be aligned with and stacked on each other, so that the stabilizer bar fixed on the first male mold and the keycap fixed on the second female mold are combined together; and
   (E) separating the first male mold from the second female mold, so that the stabilizer bar is detached from the first male mold.

2. The keycap forming method according to claim 1, wherein the step (A) comprises steps of:
   (A1) allowing the first male mold and the first female mold to be stacked on each other; and
   (A2) injecting a first molding material into a space between the first male mold and the first female mold according to the injection molding process, wherein the first molding material is filled into a first molding groove of the first male mold and a second molding groove of the first female mold, so that the stabilizer bar is formed.

3. The keycap forming method according to claim 2, wherein the step (E) comprises steps of:
   (E1) separating the first male mold from the second female mold; and
   (E2) allowing the plural fixing structures of the first male mold to be shrunk back into the first male mold to externally push the stabilizer bar, so that the stabilizer bar is detached from the plural fixing structures and fixed on the keycap.

4. The keycap forming method according to claim 1, wherein the step (B) comprises steps of:
   (B1) allowing the second male mold and the second female mold to be stacked on each other; and
   (B2) injecting a second molding material into a space between the second male mold and the second female mold according to the injection molding process, so that the keycap is formed, wherein when the second molding material is filled into a recess of the second male mold, a hook of the keycap is formed.

5. The keycap forming method according to claim 4, wherein in the step (D), a first segment of the stabilizer bar is fixed in the hook of the keycap, and a second segment of the stabilizer bar is fixed on the plural fixing structures of the first male mold.

6. The keycap forming method according to claim 4, wherein in the step (B), the second male mold is moved in a first direction through a moving mechanism, so that the second male mold and the second female mold are stacked on each other, wherein in the step (C), the second male mold is moved in a second direction through the moving mechanism, so that the second male mold and the second female mold are separated from each other.

7. The keycap forming method according to claim 1, wherein the step (D) comprises steps of:
- (D1) moving the first male mold and the second male mold, so that the second male mold is away from the second female mold and the first male mold is close to the second female mold; and
- (D2) allowing the first male mold and the second female mold to be aligned with each other, moving the first male mold, and allowing the first male mold and the second female mold to be stacked on each other.

8. The keycap forming method according to claim 7, wherein in the step (D1), a moving mechanism is rotated in a rotating direction, and the first male mold and the second male mold are correspondingly rotated with the moving mechanism, so that the second male mold is away from the second female mold and the first male mold is close to the second female mold.

* * * * *